July 11, 1961  W. L. HANLEY  2,991,535
TUNNEL KILN FIRING SECTION
Filed July 9, 1957  2 Sheets-Sheet 1
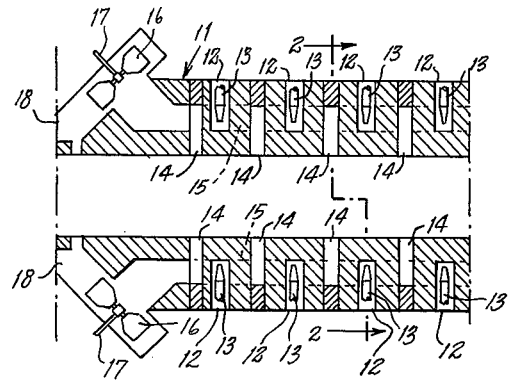
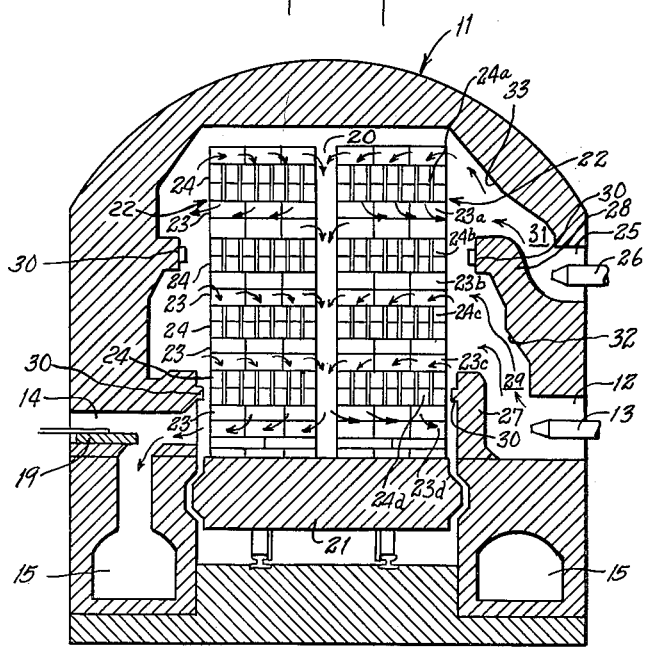
INVENTOR.
WILLIAM L. HANLEY
BY Darby & Darby
ATTORNEYS July 11, 1961 W. L. HANLEY 2,991,535
TUNNEL KILN FIRING SECTION
Filed July 9, 1957 2 Sheets-Sheet 2

INVENTOR.
WILLIAM L. HANLEY
BY Darby & Darby
ATTORNEYS

United States Patent Office 2,991,535
Patented July 11, 1961

2,991,535
TUNNEL KILN FIRING SECTION
William L. Hanley, 101 Park Ave., New York, N.Y.
Filed July 9, 1957, Ser. No. 670,801
7 Claims. (Cl. 25—142)

The present invention relates to firing sections for tunnel kilns for the processing of brick, tile or like material. More particularly the invention relates to the arrangement of burners in and the construction of such a firing section to provide uniform firing of ware processed in the kiln.

Brick tile and like material are commonly processed in tunnel kilns through which they are transported on flat bed cars. The term "ware" will be used to refer to brick, tile, or any other material susceptible of being processed in a tunnel kiln. A tunnel kiln commonly has several sections providing different conditions for the processing of the ware. For example, a kiln may contain a preheating section, a firing section and a cooling section. The present invention relates to the firing section of a tunnel kiln.

In the firing section the ware is exposed to the maximum temperature which it experiences in the course of its processing. This heat is supplied by means of burners placed in the walls of the kiln which burn a suitable fuel and are furnished with a supply of air. The air and products of combustion from the burners are directed over the stacks of ware on the ware cars to fire the ware and impart to it whatever qualities may be desired in the particular case.

Considerable difficulty is experienced in controlling the flow and temperature of gases in such a firing section to provide substantially similar conditions and particularly equal temperatures for all portions of the ware stacks on the ware cars.

It is generally desirable that all of the ware being processed at a given time be exposed to the same firing conditions and thus have substantially the same qualities. Otherwise an undue amount of sorting and wastage will be necessary to procure bricks or other ware of sufficiently uniform qualities. In some cases it may be desired to have a lower temperature on the top than on the bottom or vice versa and this may also be achieved.

It is accordingly an object of the present invention to provide a kiln and a burner arrangement in a kiln which will insure a greater degree of uniformity of conditions for all portions of the ware stacks processed in the kiln.

It is another object of the present invention to provide a firing section for a tunnel kiln wherein the temperature of all portions of the ware stacks in the kiln may be maintained substantially equal.

It is another object of the present invention to provide a kiln firing section wherein the heat from an upper burner is directed primarily to the upper portions of the ware stacks passing through said kiln while the heat from an independently controlled lower burner is directed primarily to the lower portion of the ware stacks thus allowing a closer control of the temperature of the various portions of the ware.

It is still another object of the present invention to provide a tunnel kiln having baffles along the side thereof to efficiently direct the gases from the kiln burners into desired areas of the ware stacks.

It is a further object of the present invention to provide a kiln having baffles as described above wherein the baffles are constructed of material having a high heat capacity so that the baffles act as heat reservoirs and radiators and thus increase the efficiency of the firing section.

Other objects and advantages will be apparent from a consideration of the following description in conjunction with the appended drawings, in which—

FIG. 1 shows a horizontal sectional view of a kiln firing section according to the present invention shown in part schematically;

FIG. 2 is a vertical sectional view of the firing section of FIG. 1 taken along the broken line 2—2 in FIG. 1.

Figure 3:
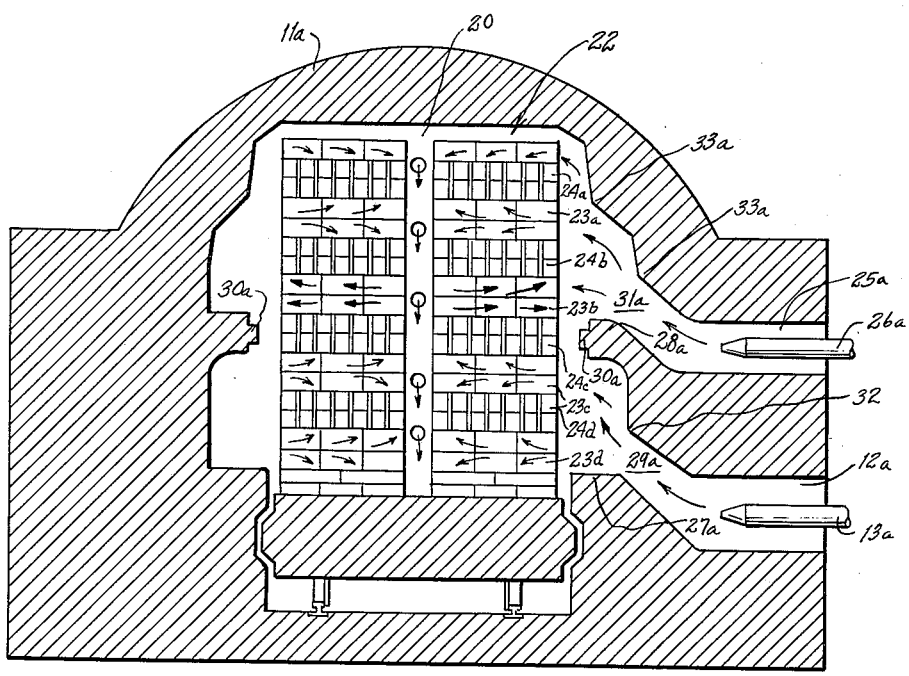
FIG. 3 is a vertical cross-sectional view of an alternative firing section showing the application of the present invention to a firing section having longitudinal gas flow.

Referring now to the drawings, a tunnel kiln firing section 11 is shown having a number of openings 12 in the wall for the placement of burners 13. It will be understood that the firing section 11 will normally be associated with other sections of a kiln such as a preheating section and a cooling section, for example. The kiln firing section 11 will normally be constructed of masonry and lined with fire brick. The method and material of construction for tunnel kilns is well known and will not be discussed in detail here.

The burners 13 may be supplied with fuel and air in a manner well known in the art. The details of the construction of the burners do not form a part of the present invention.

Exhaust ports 14 may be provided at positions between the burners 13 for exhausting the air from the firing section, and exhaust conduit 15 may be provided communicating with the ports 14 and leading to a fan 16. Fan 16 is shown schematically and is mounted on a shaft 17 which would be connected to a suitable motor (not shown). The exhaust 18 of the fan may be connected to another portion of the kiln in order to further utilize the heat of the exhaust air from the firing section. The exhaust arrangement is shown only to illustrate the complete operation of the kiln firing section. It should therefore be understood that while a particular exhaust system is shown which provides a desirable transverse circulation of the gases in the firing section, exhaust arrangements providing longitudinal circulation of the gases, or in fact any other suitable exhaust system might be utilized as well.

The firing section will have a number of burners 13 along the length of the section. The length of the firing section and the number of burners may be varied to suit a particular application. Generally ware may be processed more rapidly through a longer kiln.

Referring now more particularly to the vertical sectional view shown in FIG. 2, it will be noted that the exhaust arrangement is shown on the lefthand side of FIG. 2 and may include a damper 19 at each of the exhaust ports 14 for the control of gas circulation in the kiln.

In the center of FIG. 2 is shown a ware car 21 having ware stacks 22 placed thereon. For the purpose of illustration the ware stacks are shown to be of brick and are arranged in a fashion commonly utilized for ware of this size and shape. It should be explained that the ware is stacked in a fashion so that transverse passages 23 are provided for the circulation of hot gas through the stack and spaces are also provided at 24 to allow vertical passage of gases through the ware stack. The exhaust for the firing section being at the lower portion of the kiln wall causes the flow of gases through the ware stacks to be generally from top to bottom as indicated by the arrows. A space 20 is also provided extending vertically through the ware to facilitate gas circulation for the heating of the ware.

The present invention is primarily directed to the structure shown in the righthand side of FIG. 2. The righthand side of FIG. 2 shows the burners and the structure in the vicinity of the burners. It will be noted that in addition to the ports 12 containing burners 13 there are upper burners 26 located in ports 25 in the upper portion of the firing section wall. A baffle 27 is provided in front of the burners 13 which prevents direct impingement of the flame from the burner 13 upon the ware being processed in the kiln. The baffle 27 may be constructed of heat resistant material such as fire brick. The baffle 27 also directs the hot gases from the burner 13 upward to the intermediate portion of the ware stack 22. The hot gases from the burner are therefore prevented from passing directly out of the exhaust port 14 without first passing through the ware stack 22 and imparting a part of the heat of the hot gases to the stacked ware. The baffle 27 may be provided with a small projection 30 which tends to create a further obstruction to gases tending to flow downwardly along the outside of the baffle 27 and directly into the exhaust port 14.

A baffle 28 is also provided in front of burner 26 and serves a similar purpose to that of the lower baffle 27. The baffle 28 directs the hot gases from the burner 26 toward the upper portion of the ware stack 22. It will be noted that the heat from the burner 26 is directed primarily to the upper portion of the ware stack 22 while the heat from the lower burner 13 is directed primarily to the lower portion of the ware stack 22. It is therefore possible to adjust independently the fuel and air supplies to burners 26 and 13 and thus prevent either the top or bottom of the ware stack from developing a higher or lower temperature than the remainder of the stack. Heretofore it was impossible to locate a burner or to direct the gases from a single burner to maintain uniform temperature throughout the ware stack. By providing two independently controllable burners, a much greater uniformity of temperature and thus a much greater degree of control over the ware quality may be obtained.

It will be noted that the baffle 28 serves not only to control the gases from the burner 26 but also tends to direct the gases from the burner 13 into the lower portion of the stack of ware. A protrusion 32 may be provided on the under surface of the baffle 28 to direct a portion of the gases flowing through the channel 29 into the lower transverse passage 23c. It will generally be desirable to provide some such means of directing a proper proportion of the hot gases into the lower transverse passage 23c due to the fact that the natural tendency in such a structure is for the hot gases to rise thus causing the ware in the upper portion of a given section to be heated to a higher degree than that in the lower portion.

The baffle 28 may be constructed of heat resistant material having a high heat capacity such as fire brick or the like. The baffle 28 will be heated to a high temperature by the impingement of the gases from the burner 26 and also due to the flow of gases from the burner 13. The baffle 28 will thus constitute a heat reservoir and radiator and will increase the efficiency with which the heat from the burners is transferred to the ware transported through the firing section. It is preferred that the baffle 28 does not extend too closely to the ware stack 22 in order to prevent the production of a hot spot in the stack of ware due to radiation from the baffle 28. A projection 30 may be provided on the vertical face of the baffle 28 similar to the projection 30 on the lower baffle 27. The upper projection 30 as previously explained will tend to create an eddy current at the baffle 28 and thus inhibit downward gas flow around the upper baffle 28.

The baffle 28 also serves another function in the firing section in that it tends to direct the gas from the burners directly into the ware stack and thus minimizes eddy currents which have created difficulties in previous types of firing sections by causing the ware to be heated non-uniformly due to the difference in gas velocities at various portions of the ware stack.

A protrusion 33 similar to protrusion 32 may be provided to direct a proper proportion of the gases flowing through channel 31 into passage 23a.

FIG. 3 illustrates the application of the present invention to a kiln firing section 11a designed for longitudinal gas flow as opposed to the firing section 11 shown in FIG. 2 which is designed for transverse gas flow.

Parts of the firing section 11a shown in FIG. 3 are given the same reference numbers as corresponding parts of the firing section 11 shown in FIG. 2, except that the letter a is added to the numbers in FIG. 3. It will be noted that no exhaust ports corresponding to the exhaust ports 14 are shown in FIG. 3. The exhaust from the firing section 11a is taken off at one end, generally the entrance end, of the firing section. The gas flow in the firing section 11a is thus generally longitudinal. It should be noted that the longitudinally arranged brick sections 24 in the ware stacks 22 readily allow the passage of gases longitudinally through the stacked ware. The gas flow through the ware stacks 22 in FIG. 3 will differ somewhat from that shown in FIG. 2 as is indicated by the arrows in FIG. 3.

The firing section 11a also differs in that the passageway 29a from the lower burner 13a is lower and feeds into the extreme lower portion of the ware stack 22 whereas the extreme lower portion of the ware stack 22 in FIG. 2 communicates with the exhaust port 14.

In the firing section 11a the baffle 28a has also been lowered so that the upper burner 26a feeds the transverse channels 23a and 23b of the ware stack 22 while the lower burner 13a feeds the transverse channels 23c and 23d of the ware stack 22. Obviously the baffle 28a could be placed in the same position as shown for the baffle 28 in FIG. 2 so that the burner 26a would feed only the transverse channel 23a in the ware stack 22.

FIG. 3 illustrates the application of the present invention to a longitudinal flow kiln firing section and it may thus be seen that the invention may be applied to firing sections having either transverse or longitudinal gas flow or any combination thereof.

From the foregoing explanation it may be seen that a tunnel firing section construction is provided which allows an exceptionally high degree of control of conditions in the firing section. The fuel and air flow to the upper and lower burners may be adjusted to prevent either the lower or upper portions of the ware passing through the firing section from departing from the desired temperature. With a single burner it was generally impossible to maintain the proper temperature at one portion of the ware without causing another portion to become either too hot or too cool.

Particular embodiments of the present invention have been shown by way of illustration. However, it should be appreciated that many modifications may be made within the scope of the present invention. The invention is thus not to be construed to be limited to the particular embodiment shown but is to be limited solely by the appended claims.

What is claimed is:

1. In a tunnel kiln comprising an elongated housing forming a passageway through which ware cars having ware stacked thereon may be moved, a firing section comprising a portion of said housing, means including upper and lower sets of burners placed at spaced longitudinal positions along at least one side of said housing for preventing the direct impingement of the flame from said burners upon the ware passing through said firing section, means cooperating with said first means for directing the hot combustion gases from the upper set of burners into contact with the upper portion of the ware stack, and means cooperating with said first means for directing the hot gases from the lower set of burners into contact with the lower portion of the ware stack, whereby said hot gases circulate in a plurality of relatively short vertically spaced paths through the ware to uniformly heat the ware stacks throughout.

2. In a tunnel kiln comprising an elongated housing forming a passageway through which ware cars having ware stacked thereon may be moved, a firing section comprising a portion of said housing, independently controllable upper and lower sets of burners placed at spaced positions along the sides of said housing so as to direct their products of combustion transversely of the passageway from opposite sides thereof, a baffle extending upwardly in front of each said burner, and a protrusion along the wall of said firing section above each one of said lower sets of burners and located in the gas stream from each of said burners for directing a portion of the combustion gases from said burner into a lower portion of the ware stack zone heated by said burner.

3. In a tunnel kiln comprising an elongated housing forming a passageway through which ware cars having ware stacked thereon may be moved, a firing section comprising a portion of said housing, a plurality of pairs of vertically spaced burners placed at spaced positions along the sides of said housing, the burners of each pair being arranged to direct the products of combustion in opposition to those of another pair, baffles extending upwardly in front of each said burner to effect said transverse direction of said combustion products, and a protrusion along the wall of said firing section above each of the lower ones of said burners and located in the gas stream from each of said lower burners for directing a portion of the combustion gases from said lower burners into a lower portion of the ware stack zone heated by said burner.

4. In a tunnel kiln comprising an elongated housing forming a passageway through which ware cars having ware stacked thereon may be moved, a firing section comprising a portion of said housing, a plurality of pairs of burners placed at spaced positions along the sides of said housing, said burners being disposed in pairs in vertical relation and in pairs in alignment transversely of said passageway, a baffle extending upwardly in front of each of said burners said baffles being formed of a volume of material having a high heat storage capacity, and a protrusion along the wall of said firing section above each of said burners and located in the gas stream from each of said burners for directing a portion of the combustion gases from said burners into upper and lower portions of the ware stack zone at each side.

5. In a tunnel kiln comprising an elongated housing forming a passageway through which ware cars having ware stacked thereon may be moved, a firing section comprising a portion of said housing, first means for introducing and directing gases into the upper portion of said section from each side, second means for introducing and directiong gases into the lower portion of said section from each side, means for heating the first said gases including a first set of burners located in the path thereof near their point of admission into said firing section, means preventing the impingement of flames from the first said set of burners on ware passing through said section, baffle means comprising a wall of a volume of material having a high heat capacity extending inwardly toward the center of said section to at least partially obstruct the path for gases flowing along the outside of said stacks of ware from one to another of said upper and lower portions of said firing section, means for heating the second said gases including a second set of burners controllable independently of said first set and located in the path of the second said gases near their point of admission into said firing section, further means preventing the impingement of flames from said second set of burners on ware passing through said section, and means communicating with the extreme lower portion of said passageway adjacent the lower portion of said ware stacks for withdrawing gases from said firing section at each side through said ware stacks near the bottom.

6. In a tunnel kiln comprising an elongated housing forming a passageway through which ware cars having ware stacked thereon may be moved, a firing section comprising a portion of said housing, first means for introducing gases at each side into the upper portion of said section, second means for introducing gases at each side into the lower portion of said section, means for heating the first said gases and admixing products of combustion therewith including a first set of burners located in the path thereof, first baffle means preventing the impingement of flames from the first said set of burners on ware passing through said section, said baffle means comprising a wall extending upwardly in front of said first set of burners and extending inwardly toward the center of said section to at least partially obstruct the path for gases flowing along the outside of said stacks of ware from one to another of said upper and lower portions of said firing section, means for heating the second said gases and admixing products of combustion therewith including a second set of burners controllable independently of said first set and located in the path of the second said gases, second baffle means preventing the impingement of flames from said second set of burners on ware passing through said section, and means communicating with the extreme lower portion of said passageway at each side for withdrawing gases from said firing section through the lower portion of said ware stacks.

7. In a tunnel kiln comprising an elongated housing forming a passageway through which ware cars having ware stacked thereon may be moved, a firing section comprising a portion of said housing, first means for introducing and directiong gases into the upper portion of said section at each side, second means for introducing and directing gases into the lower portion of said section at each side, means for heating the first said gases and admixing products of combustion therewith including a first set of burners located in the path thereof near their point of admission into said firing section, first baffle means preventing the impingement of flames from the first said set of burners on ware passing through said section, said baffle means comprising a wall of a volume of material having a high heat storage capacity extending upwardly in front of said first set of burners and extending inwardly toward the center of said section to at least partially obstruct the path for gases flowing along the outside of said stacks of ware from one to another of said upper and lower portions of said firing section, means for heating the second said gases including a second set of burners controllable independently of said first set and located in the path of the second said gases near their point of admission into said firing section, second baffle means preventing the impingement of flames from said second set of burners on ware passing through said section, said second baffle means comprising a large volume of material having a high heat storage capacity extending upwardly in front of said second set of burners and placed adjacent the position of the extreme lower portion of stacks of ware to substantially prevent the direct introduction of heated gases therein, and means communicating with the extreme lower portion of said pasageway at each side for withdrawing gases from said firing section through the lower portion of said ware stacks.

References Cited in the file of this patent

UNITED STATES PATENTS

| | | |
|---|---|---|
| 1,615,217 | Dressler | Jan. 25, 1927 |
| 1,859,507 | Hanley | May 24, 1932 |
| 2,436,024 | Smith | Feb. 17, 1948 |
| 2,550,807 | Hanley | May 1, 1951 |